United States Patent [19]

Theodore et al.

[11] Patent Number: 4,853,428

[45] Date of Patent: * Aug. 1, 1989

[54] ELASTOMER COMPOSITIONS WITH SUPERIOR LOW TEMPERATURE FLEXIBILITY

[75] Inventors: Ares N. Theodore, Farmington Hills; Paul C. Killgoar, Jr., Livonia, both of Mich.

[73] Assignee: Ford Motor Company, Dearborn, Mich.

[ * ] Notice: The portion of the term of this patent subsequent to Feb. 24, 2004 has been disclaimed.

[21] Appl. No.: 115,800

[22] Filed: Nov. 2, 1987

[51] Int. Cl.$^4$ ................................................ C08K 5/01
[52] U.S. Cl. ...................................... 524/491; 524/490; 524/481; 524/483; 15/250.36; 15/250.42
[58] Field of Search ................. 524/490, 491, 481, 483

[56] References Cited

U.S. PATENT DOCUMENTS 4,575,574  5/1986  Kressge ..................................... 585/12
4,616,060 10/1986  Killgoar, Jr. .......................... 524/574
4,645,791  2/1987  Theodore et al. ..................... 524/490

Primary Examiner—Joseph L. Schofer
Assistant Examiner—Peter D. Mulcahy
Attorney, Agent, or Firm—Lorraine S. Melotik; Roger L. May

[57] ABSTRACT

This invention relates to an environmentally durable composition which has superior low temperature dynamic properties. The composition comprises a substantially homogeneous mixture of 100 parts by weight elastomer having a fully saturated backbone, curing agent for the elastomer in amounts sufficient to cross-link the elastomer, reinforcing particulate filler, at least 20 parts by weight of particularly defined polyalphaolefin oil and, preferably, particularly defined paraffinic oil and/or naphthenic oil. Inclusion of the polyalphaolefin oil in the composition improves the low temperature dynamic properties and processability of the elastomer, which are further improved by inclusion of naphthenic oil and/or paraffinic oil therein. Particulate graphite may be incorporated into the composition to lower its friction.

20 Claims, No Drawings

ELASTOMER COMPOSITIONS WITH SUPERIOR LOW TEMPERATURE FLEXIBILITY

TECHNICAL FIELD

This invention relates to an environmentally durable elastomer composition which has superior low temperature dynamic properties. More particularly, the elastomer composition comprises elastomer having a fully saturated backbone, curing agent for the elastomer, reinforcing particulate filler and polyalphaolefin oil. The composition may further include particularly defined naphthenic oil and/or paraffinic oil.

BACKGROUND ART

Elastomer compositions made of natural rubber generally have good low temperature dynamic properties. However, because elastomers like natural rubber have unsaturated backbones, they are subject to chemical changes caused by environmental attack of the composition by, e.g., ultraviolet light, heat, oxygen, and ozone during use. These chemical changes in the elastomer, generally by means of reactions at the unsaturated sites, change its physical properties. Consequently, the composition begins to harden and takes a set. If such a composition has been used to form, e.g., wiper blades, the blades will no longer conform well to the windshield curvature. In order to overcome problems associated with poor environmental durability, elastomer compositions have been made from elastomers, such as ethylene-propylene-diene rubber (EPDM), which have a fully saturated backbone. Since these elastomers do not possess any reactive sites in their backbone, compositions comprising them possess excellent environmental degradation resistance. One such composition, employed for windshield wiper blades, is disclosed by Killgoar, Jr. in U.S. Pat. No. 4,616,060, assigned to the assignee of this invention. The windshield wiper composition disclosed therein comprises elastomer having a fully saturated backbone, curing agent, reinforcing particulate and graphite. The graphite is incorporated into the windshield wiper composition to reduce the coefficient of friction of the blade material.

However, at temperatures below about 0° C., such elastomer compositions, while having excellent environmental durability, display dynamic properties (i.e., flexibility) that are generally inferior to those of many natural rubber compositions. The properties of the elastomer compositions may be modified by incorporating additives into the compositions. However, the inclusion of a particular additive into the compositions may improve one property of the composition while having a deleterious effect on another property. For example, naphthenic oils, which are often added to improve the processing of elastomer compositions, generally do not improve the low temperature dynamic properties of the elastomer composition. U.S. Pat. No. 4,645,791, assigned to the assignees of this invention, discloses that the low temperature dynamic properties of environmentally durable elastomer compositions, such as those comprising EPDM, can be improved by incorporating particularly defined aliphatic oil therein.

BRIEF DESCRIPTION OF THE INVENTION

This invention is directed to an environmentally durable elastomer composition which has superior low temperature dynamic properties. The composition comprises a substantially homogeneous mixture of: (a) 100 parts by weight elastomer having a fully saturated backbone, (b) curing agent for the elastomer in an amount sufficient to crosslink the elastomer, (c) reinforcing particulate filler, and (d) at least 20 parts by weight, more preferably between about 30 and about 80 parts by weight polyalphaolefin oil selected from polyalphaolefin oils having a broad molecular weight distribution and a kinematic viscosity between about 2 and about 200 centistokes. The preferred viscosity range is about 3-10 centistokes. The polyalphaolefin oil of the invention has a very low volatile content, i.e. greater than about 85% by weight of the oil boils above about 180° C. The composition preferably further comprises at least about 2 parts by weight modifying oil selected from the group consisting of: (a) naphthenic oil having a number average molecular weight ($\overline{M}_n$) of about 300 and about 500 and a pour point between about $-30°$ F. and about $+25°$ F.; (b) paraffinic oil having a number average molecular weight ($\overline{M}_n$) between about 300 and about 1000 and a pour point between about 0° F. and about 10° F.; and (c) mixtures of (a) and (b). When employed in the composition, naphthenic oil is included in an amount between preferably about 2 and about 40 parts by weight and/or the paraffinic oil is included in an amount between preferably about 3 and about 50 parts by weight, the parts by weight of each oil being based on 100 parts by weight of elastomer having a fully saturated backbone.

The elastomer composition of this invention may be employed as a windshield wiper material. If such use is desired, particulate graphite is preferably incorporated into the composition of this invention to modify its frictional properties. Preferably, when the composition of this invention is employed as a windshield wiper composition, the elastomer having a saturated backbone comprises or consists essentially of ethylene-propylene-diene rubber (EPDM), the curing agent comprises an accelerated sulfur curing system, and the reinforcing filler comprises carbon black. The polyalphaolefin oil is included in the wiper composition in an amount between about 20 and about 100 parts by weight; and the friction modifying graphite is included in an amount of between about 20 and about 100 parts by weight (the weight of each oil and the graphite individually being based on 100 parts by weight of the EPDM).

Advantageously, cured materials made from the elastomer composition of this invention possess excellent environmental degradation resistance as well as improved low temperature dynamic properties. The compositions of this invention also exhibit improved processability due to the use of the particularly defined polyalphaolefin oil of the present invention composition. The processability and overall physical properties of the composition may be further improved by including particularly defined naphthenic oil and/or paraffinic oil in addition to the polyalphaolefin oil in the composition.

DETAILED DESCRIPTION OF THE INVENTION

The invention of this application is directed to an environmentally durable elastomer composition which has excellent low temperature dynamic properties. The composition of this invention comprises a substantially homogeneous mixture of: elastomer having a fully saturated backbone, curing agent for the elastomer, reinforcing particulate filler, polyalphaolefin oil and, optionally but preferably, naphthenic oil and/or paraffinic oil. Each of these materials, as well as optional materials which may be included in the composition, will be discussed hereinafter in detail.

The composition of this invention comprises elastomer having a fully saturated backbone, i.e., elastomer wherein a continuous path can be traced from one end of the elastomer polymer to the other without going through a double bond. Many such elastomers having a fully saturated backbone are known to those skilled in the art. Exemplary of numerous such elastomers having a fully saturated backbone which may be employed in the composition of this invention are ethylene-propylene-diene rubber (EPDM), commercially available as Epcar (trademark, Polysar Ltd., Sarnia, Canada), Vistalon (trademark, Exxon, Houston, Tex.), Nordel (trademark, duPont, Wilmington, Del.), and Epsyn (trademark, Copolymer Rubber Chemicals Corp., Baton Rouge, La.). Other suitable elastomers having a saturated backbone include ethylene propylene rubber, available, e.g., as Epcar (trademark), Royalene (trademark, Uniroyal, Naugatuck, Conn.), Vistalon (trademark), and Epsyn (trademark). Saturated nitrile elastomers which may similarly be employed include, but are not limited to, Therban (trademark, Mobay Chemical, Pittsburgh, Pa.). Still other elastomers having a saturated backbone comprise chlorosulfonated polyethylene, available commercially as Hypalon (trademark, duPont).

The elastomer employed in the composition of this invention may be a mixture of two or more different elastomers having a fully saturated backbone, such as those described above. In addition to the elastomer having a fully saturated backbone, the composition of this invention may include a minor proportion of elastomer having an unsaturated backbone, e.g., polyisoprene or bromobutyl rubber, as a modifying elastomer. However, in order to maintain maximum environmental durability of the composition, it is most preferable not to include any such elastomers having an unsaturated backbone in the composition.

The composition of this application also includes curing agent for the elastomer in an amount which is sufficient to crosslink the elastomer. As would be apparent to one in the art, if elastomer having an unsaturated backbone is included in the composition of this invention, sufficient curing agent would be employed to cure the elastomer having the fully saturated backbone and the elastomer having an unsaturated backbone. The selection of the particular curing agent and the optimal amount to be employed for a particular elastomer composition is dependent upon, e.g., desired physical properties and compatibility with the process used to form the cured composition, as is known to those skilled in the art, and thus such selection would be within the skill of those in the art. Typically, such curing agents include, but are not limited to, sulfur systems, e.g., conventional sulfur, efficient and semi-efficient accelerated sulfur systems, peroxide curing agents, etc. Such systems are well known in the art, and are widely described in literature, e.g., "Vulcanization and Vulcanizing Agents", W. Hoffman, Maclaren and Sons Ltd., London, 1967, which is hereby expressly incorporated by reference in this application for such teachings.

Another component of the composition of this invention is reinforcing particulate filler, which comprises organic or inorganic particulate, or mixtures thereof. Examples of preferred organic and inorganic particulate include carbon black, zinc oxide, fine particle calcium carbonates, silicas and silicates. The amount and type of reinforcing filler to be employed in the composition of this invention would be based on the desired properties and use of the elastomer composition of this invention. Selection of the optimal amount and type of filler to be employed would be within the skill of one in the art.

As discussed above, the superior low temperature dynamic properties of the elastomer composition result from the inclusion of particularly defined polyalphaolefin oil and, optionally, particularly defined naphthenic oil and/or paraffinic oil in the composition. At least 20 parts by weight of the polyalphaolefin oil is included in the composition based on 100 parts by weight of the elastomer having a fully saturated backbone. Preferably, the amount of polyalphaolefin oil included in the composition is between about 30 and 80 parts by weight based on 100 parts by weight of the elastomer having a fully saturated backbone, which is employed in the composition. The polyalphaolefin oil is selected from polyalphaolefin oils having a broad molecular weight distribution (such that the oil is a blend of polyaophaolefin oil compounds of broadly diverse molecular weights) and a kinematic viscosity between about 2 and about 200 centistokes. The preferred kinematic viscosity range of the oil is about 3-10 centistokes. As is known to those skilled in the art, the kinematic viscosity of a fluid is its dynamic viscosity divided by its density and can be determined by ASTM method D445. Kinematic viscosities are usually used to characterize fluids such as lubricants and have units of centistokes (cSt). The polyalphaolefin oil blend which is suitable for use in the present invention has a very low volatile content, i.e., greater than about 85% by weight, more preferably greater than about 92% by weight, most preferably greater than about 98% by weight of the polyalphaolefin oil boils above 180° C. These polyalphaolefin oils are substantially hydrogenated isoparaffinic hydrocarbons which, as discussed above, have a broad molecular weight distribution. The polyalphaolefin oil molecules are highly branched, compact molecules which possess a high degree of thermal and chemical stability. They also have hydrolytic stability and good compatibility with the elastomers of the composition. Additives which are compatible with the oil may be included in the polyalphaolefin oil as long as such additives are substantially non-reactive with the elastomer composition. These polyalphaolefin oils, because they have a broad molecular weight distribution, also improve the processability of the elastomer composition of the invention in addition to modifying its low temperature dynamic properties. As is known in the art, the processability of an elastomer composition is related to such factors as its ability to be easily molded, e.g., due to the softness and flowability of the composition, and to the ability of the composition to be loaded with reinforcing particulate such as carbon black. The polyalphaolefin oil of the invention composition may be selected, e.g., from synthetic polyalphaolefin basestock oils, synthetic polyalphaolefin oil based engine oils and blends thereof. Polyalphaolefin oils suitable for use in the present invention are commercially available and include, but are not limited to, those available from Chevron Chemical Company (Houston, Tex.) and Ethyl Corporation (St. Louis, Mo). Those available from Chevron Chemical Co. include the Synfluid (trademark) series, e.g., Synfluid PAO 2cSt, Synfluid PAO 4cSt, Synfluid PAO 6cSt, Synfluid PAO 8cSt, Synfluid PAO 10cSt, Synfluid PAO 40cSt, and Synfluid PAO 100cSt. Those available from the Ethyl Corporation include those of the Hitec (trademark) series. The polyalphaolefin (PAO) employed in this invention may be a mixture of available polyalphaolefin oil blends.

As discussed above, the invention composition preferably further comprises at least 2 parts by weight modifying oil selected from particularly defined (i) naphthenic oils, (ii) paraffinic oils, and (iii) mixtures of these naphthenic oils and paraffinic oils. More preferably, the modifying oil is selected from between about 2–40 parts by weight of the defined naphthenic oils, between about 3–50 parts by weight of the defined paraffinic oils and mixtures thereof.

The naphthenic oil is selected from naphthenic oils having a number average molecular weight ($\overline{M}_n$) between about 300 and about 500, preferably a number average molecular weight ($\overline{M}_n$) between about 350 and about 500, and a pour point between about $-30°$ and about $+25°$ F. Naphthenic oils which are suitable for use in the present invention have a very low volatile content, i.e., preferably at least 86%, more preferably at least 93%, most preferably greater than about 97% by weight of the naphthenic oil boils above 107° C. (ASTM method D972-81). The naphthenic oil employed in this invention may be a mixture of such naphthenic oils. Exemplary of the commercially available naphthenic oils which may be employed in this invention are those of the Circosols and Sunthene (trademarks, Sun Refining and Marketing Co., Philadelphia, Pa.) series, the latter series being preferred for use in this invention. Exemplary of such naphthenic oils suitable for use in this invention are Synthene 255, 450, 380, 4130 and 4240, the latter three being most preferred for use herein. These oils, made by hydrotreating Circosol (trademark) naphthenic oils, are lighter in color and possess excellent resistance to discoloration by heat and ultraviolet light. By means of this refining process, polar compounds containing nitrogen, sulfur and oxygen are minimized in the resulting oils. The high aromatic compound content of the oil is maintained which provides for optimal compatibility with the elastomer composition. Exemplary of other commercially available naphthenic oils which may be employed in this invention are those obtained from Exxon, (Houston, Tex.), e.g., Flexon 690 and Flexon 680 (trademark) and Shell Chemical Company (Houston, Tex.), e.g., Shellflex 371 and Shellflex 412 (trademark). These oils have properties such as molecular weight and volatile content similar to those of the Sun Refining and Marketing Co. naphthenic oils described above. The commercially available naphthenic oils useful in the present invention may, in addition to the naphthenic component, comprise fractions of other oils such as aromatic oils and paraffinic oils. These naphthenic oils, when incorporated into the composition of this invention with the particularly defined polyalphaolefin oil, improve the overall properties of the composition, e.g., physical properties and dispersion of ingredients are improved.

The paraffinic oil is selected from paraffinic oils having a number average molecular weight ($\overline{M}_n$) between about 300 and about 1000, preferably a number average molecular weight ($\overline{M}_n$) between about 400 and about 800, and having a pour point between about 0° F. and about 10° F., preferably about 5° F. Paraffinic oils which are suitable for use in the present invention have a very low volatile content, i.e., preferably at least 87%, more preferably at least about 99% by weight of the paraffinic oil boils above 100° C. (ASTM method D972-81). The paraffinic oil employed in this invention may be a mixture of such paraffinic oils. These oils are characterized structurally by saturated rings and long paraffinic side chains (66% minimum Cp). Since they are highly saturated, they are resistant to oxidation and color degradation by ultraviolet light. Exemplary of the paraffinic oils which may be employed in this invention are those of the Sunpar (trademark, Sun Refining and Marketing Co., Philadelphia, Pa.) series, such as Sunpar 120, 130, 150, 2170 and 2280. Other commercially available paraffinic oils which may be employed as the paraffinic oil in this invention include those obtained from Exxon, e.g., Flexon 815 and 865 (trademark) and Shell Chemical Company, e.g., Shellflex 790 and 1790 (trademark), which have properties such as molecular weight and volatile content similar to the Sunpar oils. The paraffinic oils employed in the present composition exhibit excellent compatibility with the elastomer employed in this invention composition. Commercially available paraffinic oils which may be employed in the present invention may comprise fractions of other oils, e.g., aromatic and naphthenic components.

As discussed above, the composition of this invention may also be employed as a windshield wiper composition. Preferably, the saturated backbone elastomer of the windshield wiper blade composition comprises EPDM and employs an accelerated sulfur curing system. The reinforcing particulate in such a windshield wiper composition preferably comprises carbon black, generally in an amount of between about 15 and about 100 parts by weight, based on 100 parts by weight of the elastomer having a fully saturated backbone. The preferred carbon blacks for use in the windshield wiper composition have an average particle size of 20–60 nm (nanometer) and are employed most preferably in the composition in an amount of from about 30 to 70 parts by weight per hundred parts by weight of such elastomer.

As taught above, when employing the present invention composition to make windshield wiper blades, graphite is preferably incorporated into the elastomer composition in order to reduce the coefficient of friction of the windshield wiper. In order to reduce the friction of the blades, preferably at least about 20 parts by weight particulate graphite is incorporated in the elastomer composition (based on 100 parts by weight of elastomer having a fully saturated backbone). In one preferred embodiment of the windshield wiper elastomer composition, wherein the elastomer having a fully saturated backbone comprises EPDM, the elastomer composition preferably comprises between about 20 and about 100 parts by weight particulate graphite per 100 parts by weight of EPDM. The particle size of the graphite employed in the windshield wiper composition is not limited to any particular particle size. Mixture of particle sizes may also be employed. More particularly, the optimal particle size to be employed in the composition would be suggested in part, by the method of manufacture of the blades. Selection of preferred particle size would be within the skill of those in the art. Graphite is readily commercially available as, for example, Dixon 1176, Dixon 200-42 and Dixon 1355 (trademark, The Joseph Dixon Crucible Co., Jersey City, N.J.). The polyalphaolefin oil is included in the windshield wiper composition in an amount of at least 20 parts by weight as discussed above based on the weight of the elastomer having the fully saturated backbone. Preferably, when the elastomer having the fully saturated backbone is EPDM, the polyalphaolefin oil is included in the windshield wiper composition in an amount of between about 20 and about 100 parts by weight, based on 100 parts by weight of the EPDM. The windshield wiper composition also preferably comprises at least 2 parts by weight of the naphthenic oil and/or at least 3 parts by weight of the paraffinic oil defined above, each individually based on 100 parts by weight of the elastomer. More preferably, the windshield wiper composition comprises about 5–40 parts by weight of the naphthenic oil and/or about 6–50 parts by weight of the paraffinic oil, based as defined above.

The elastomer composition of this invention may optionally include other materials commonly employed in such formulations. These optional materials include non-reinforcing fillers such as $CaCO_3$, clay, etc., cure activators such as stearic acid and zinc oxide; and other additives such as dessicants like CaO. Still other materials like antioxidants may be included in the composition. While it is known that, e.g., in compounding ethylene-propylene type rubbers, added antioxidants may not be required, they may be beneficial in many cases. Antioxidants include, e.g., polymerized quinolines, hindered amines, phenols and the like known in the art. Selection and amount of optimal materials which would be employed in the composition would be dependant on the use and desired properties of the composition. As such, their selection would be within the skill of those in the art in view of the present disclosure.

The composition of this invention may be employed to make, e.g., windshield wiper blades and ring seals, as would be apparent to those skilled in the art. In making an article from the composition, the elastomer composition is first mixed together to form a substantially homogeneous mixture, generally in a Banbury type mixer or on two-roll rubber mills, generally the curing agent being incorporated last, whereafter the composition is formed into the article and cured. Alternatively, the composition may be formed and cured whereafter the article is formed from the cured elastomer. The method of making the composition and forming the article from the composition is not limited to any particular method.

The following test methods were employed in evaluating the compositions described in the examples set forth below.

TESTING METHODS

Tensile testing of dumbbell Specimens: ASTM D 412 procedure is used for determination of tensile strength and elongation to break. Dumbbell specimens are cut with the standard die C from a thin slab (0.25–0.35 cm thick) and used for this testing.

Tear testing: Tear specimens, cut with a die B, are tested according to ASTM D 624 procedure. Razor-nicked specimens are used for determination of tear resistance.

Durometer Hardness: The hardness of compression set buttons is determined according to ASTM D 2240 procedure.

Compression set, %: Compression set testing was done according to ASTM D 395 (method B) on compression set buttons. The test conditions were 22 hours at 85° C. under 25% compression in a ventilated, air circulating oven.

Dynamic Mechanical Properties: Dynamic properties such as Log E' (storage modulus), Log E" (loss modulus) and Tan δ (loss tangent) were obtained with a Dynamic Mechanical Thermal Analyzer (Polymer Laboratories Limited). The dual cantilever mode of testing was used with the specimen in the form of a rectangular bar. Typical bar dimensions were: length 7.00 mm, width 6.45 mm and thickness 2.70 mm. The specimens were cooled to −120° C. and then heated at 1° C. per minute from −90° C. to +25° C. The dynamic mechanical thermal analyzer was interfaced with a Hewlett Packard 9816 computer and 7475A plotter. Log E', Log E", and Tan δ were plotted as a function of temperature. Testing was carried out at frequencies of 0.1, 1.0 and 10 HZ.

The invention will be further understood by referring to the following detailed examples. It should be understood that the specific examples are presented by way of illustration and not by way of limitation.

EXAMPLE 1

Windshield wiper blades compounds with superior low temperature dynamic properties were prepared by combining the following materials in an internal mixer:

| Compound | Amount |
| --- | --- |
| EPDM (Epcar 585[1]) | 387.00 |
| Carbon black (N-347[2]) | 155.00 |
| Stearic acid | 3.90 |
| Zinc oxide | 20.00 |
| Calcium oxide | 20.00 |
| Synfluid PAO 4cSt[3] | 96.50 |
| Synfluid PAO 6cSt[4] | 96.50 |
| Graphite, (Dixon 200-42[5]) | 232.00 |
| 2-mercaptobenzothiazole | 7.80 |
| Tetramethylthiuram disulfide | 3.10 |
| Tellurium diethyldithiocarbamate | 3.10 |
| Sulfur #104 (Rubbermakers)[6] | 3.10 |
| Dipentamethylenethiuram hexasulfide | 3.10 |

[1]Trademark, Polysar Ltd., EPDM
[2]ASTM Designation
[3]Trademark, Chevron Chemical Company
[4]Trademark, Trademark, Chevron Chemical Company
[5]The Joseph Dixon Crucible Co., particulate graphite
[6]Trademark, Harwick Chemical Corp., Akron, Ohio, sulfur A six mixing schedule was employed in mixing the ingredients in a laboratory Banbury mixer (Model BR). Initially, all dry ingredients were mixed with the oil blend, Synfluid PAO 4 cSt (trademark) and Synfluid PAO 6 cSt (trademark), for one minute. The EPDM was then added to the Banbury mixing chamber and mixed for four additional minutes. Then the components of the cure system were added to the mixture and mixing was continued for one more minute. The resulting compound A was further mixed on a 200×400 mm two-roll mill while it was still warm. Thermal gravimetric analysis indicated that this compound A has 0.2% weight loss when heated at 160° C. for 30 minutes. A similar compound B made as described above for compound A except that a conventional processing oil (Circosol 4240, trademark, Sun Petroleum Products, a naphthenic oil) was employed in place of the polyalphaolefin oil. Compound B had a weight loss of 1.15% when similarly heated. The lower weight loss of volatile components from compound A results in better quality of parts molded from compound A.

After determining the cure properties of the compound on an oscillating disk rheometer (Monsanto 900), slabs and compression set buttons were molded from compound A and compound B at 160° C. for 24 and 29 minutes respectively. The physical properties (Tensile strength, elongation etc.) of these compounds are fairly close but the low temperature dynamic mechanical properties are substantially different. Compound A exhibits superior low temperature flexibility as shown by the tan δ value (peak) in the table below:

| Compound | Log E', Pa (1HZ, 20° C.) | Tan δ (1HZ, Peak ° C.) |
|---|---|---|
| Compound A | 6.85 | −55° C. |
| Compound B | 6.95 | −35° C. |

The low temperature flexibility of compound A as indicated by the data is not only better than that of compound B but also superior to that of a production natural rubber compound (tan δ=−47° C.).

A strip of compound A (90.00 g) was placed in the cavity of a compression mold for the preparation of windshield wiper blades. The material was cured for 25 minutes at 160° C. The resulting blades had a smooth surface and upon cutting through the blade no defects were found in the interior of the blades.

EXAMPLE 2

The procedure of Example 1 for making compound A was repeated with the only exception that the following oil blend was employed: 100.00 g polyalphaolefin (Synfluid PAO 4 cSt trademark) and 100.00 g polyalphaolefin (Synfluid PAO 8 cSt trademark). The processability of the mix and the overall properties of molded parts were very good. Blades molded from this compound exhibited low friction and good wipe quality.

EXAMPLE 3

The procedure of Example 1 for making compound A was repeated with the following differences: 120.00 g of Synfluid PAO 4 cSt (trademark) was combined with 80.00 g of Synfluid PAO 10 cSt (trademark) to form the polyalphaolefin blend. The resulting elastomer material was moldable and had good physical properties. Blades molded from this material had a smooth surface

EXAMPLE 4

The procedure of Example 1 for making compound A was repeated with the exception that the polyalphaolefin oil blend consisted of 150.00 g of Synfluid PAO 100 cSt (trademark) and 100.00 g of Synfluid PAO 2 cSt (trademark). The mix was moldable.

EXAMPLE 5

The procedure of Example 1 for making compound A was repeated with the exception that the polyalphaolefin oil blend consisted of 80.00 g Synfluid PAO 4 cSt (trademark), 80.00 g Synfluid PAO 6 cSt (trademark) and 50.00 g of Synfluid PAO 8 cSt (trademark). The processability of this compound was acceptable. Blades molded at 150° C. for 30 minutes had low friction and good wipe quality.

EXAMPLE 6

The procedure of Example 1 for making compound A was repeated with the only exception that part of the polyalphaolefin blend (100.00 g) was replaced with 100.00 g of paraffinic oil (Sunpar 2280, trademark). The resulting mixture had good processing characteristics. The mixture was compression molded into wiper blades at 160° C. for 22 minutes. The molded blades had a smooth surface and low friction.

EXAMPLE 7

The experimental procedure of Example 1 for making compound A was repeated with the exception that half of the polyalphaolefin blend was replaced with 100.00 g of naphthenic oil (Sunthene 4240, trademark). The overall properties (physical and dynamic) of this compound were good.

EXAMPLE 8

The procedure of Example 1 for making compound A was repeated with the sole exception that half of the polyalphaolefin blend was replaced with 50.00 g of a paraffinic oil (Sunpar 2280, trademark) and 50.00 g of a naphthenic oil (Sunthene 4240, trademark). The material was moldable and exhibited good properties. Blades molded from the composition exhibited smooth surfaces.

EXAMPLE 9

The procedure of Example 1 for making compound A was repeated with exception that the graphite (Dixon 200-42, trademark) was replaced with an equal amount of another graphite (Dixon 1355, trademark). Parts were molded and exhibited good physical and dynamic properties. Wiper blades molded from the composition had low friction and good wipe quality.

EXAMPLE 10

The procedure of Example 2 was repeated with the sole exception that the graphite (Dixon 200-42, trademark) was replaced by an equal amount of another graphite, (Dixon 1176, trademark). Blades were molded from the composition. The wiper quality of the molded blades was close to that of blades prepared from the compound prepared in Example 2.

EXAMPLE 11

The procedure of Example 1 for making compound A was repeated with the exception that 116.10 g carbon black (N-347, ASTM designation) were employed in preparing the compound. The mix was molded under similar conditions and exhibited good physical properties. Although the tan δ (peak=−55° C.) was the same as that for compound A of Example 1, the dynamic modulus (Log E' at 20° C.) was lower (6.75 Pa) than that of compound A. Windshield wiper blades molded from this material had a smooth surface and no defects. The low temperature flexibility of these blades was excellent.

EXAMPLE 12

The procedure of Example 1 for making compound A was repeated with the following differences: 116.10 g carbon black (N-347 ASTM designation) and 120.00 g Synfluid PAO 4 cSt (trademark) and 115.00 g Synfluid PAO 6 cSt (trademark) were employed in preparing the mix. This compound was molded into slabs at 160° C. for 24 minutes. The slabs exhibited good physical properties and had no bubbles on their surface or in their interior. The dynamic mechanical properties of this compound in the temperature range −90° to +20° C. were similar to those of compound A of Example 1. This compound has a low weight loss when heated at 160° C. for 30 minutes as did compound A of Example 1. Windshield wiper blades prepared from this mix had a smooth surface. These blades exhibited good durability and low friction.

EXAMPLE 13

The procedure of Example 2 was repeated with the exception that the polyalphaolefin blend was replaced by an equal amount of Synfluid 5w-30 CD/CF (trademark, Chevron Chemical Company) engine oil and transmission fluid. The composition had a very low weight loss when heated at 160° C. for 30 minutes (0.70% by weight). Windshield wiper blades were molded from this composition at 160° C. for 22 minutes. They had a smooth surface and no defects.

EXAMPLE 14

The procedure of Example 1 for making compound A is repeated with the exception that Epcar 585 (trademark, Polysar Ltd.) is replaced by an equal amount of Epsyn 5509 (trademark, Copolymer Rubber Chemicals Corp., EPDM). The ingredients are mixed and molded parts are made from this compound by molding for 20 minutes at 155° C. This compound is also suitable for the preparation of extruded parts.

EXAMPLE 15

The procedures of Example 1 were repeated with the following differences. The amount of carbon black (N-347, ASTM designation) was reduced to 75 grams and the amount of graphite (Dixon 200-42, trademark) was increased to 290 g. The resulting compound exhibited low volatility when heated at 160° C. for 30 minutes (0.50% by weight). Windshield wipers molded from this compound at 160° C. for 20 minutes displayed excellent low temperature flexibility.

EXAMPLE 16

The procedure of Example 1 for making compound A is repeated with the exception that the following amounts of curatives are employed in preparing the compound:

| | |
|---|---|
| 2-mercaptobenzothiazole | 8.5 g |
| Tetramethylthiuram disulfide | 3.9 g |
| Tellurium diethyldithiocarbamate | 3.10 g |
| Sulfur #104 (Rubbermakers)[1] | 1.50 g |
| Dipentamethylenethiuram hexasulfide | 3.10 g |

[1]Trademark, Harwick Chemical Corporation parts molded form this compound at 160° C. and for 22 exhibit good low temperature flexibility.

EXAMPLE 17

An elastomer compound was prepared by mixing the following ingredients in a Banbury mixer, according to the procedure of Example 1.

| | |
|---|---|
| Epcar 585[1] | 500.00 g |
| Carbon black (N-351[2]) | 300.00 g |
| Stearic acid | 5.00 g |
| Zinc oxide | 25.00 g |
| Synfluid PAO 4cSt[3] | 150.00 g |
| Synfluid PAO 6cSt[4] | 150.00 g |
| 2-mercaptobenzothiazole | 10.00 g |
| Tetramethylthiuram disulfide | 4.00 g |
| Tellurium diethyldithiocarbamate | 4.00 g |
| Sulfur #104 (Rubbermakers)[5] | 4.00 g |
| Dipentamethylenethiuram hexasulfide | 4.00 g |
| Calcium oxide | 25.00 g |

[1]Trademark, Polysar Ltd., EPDM
[2]ASTM Designation
[3]Trademark, Chevron Chemical Company
[4]Trademark, Chevron Chemical Company
[5]Trademark, Harwick Chemical Corp.

The above mix was compression molded at 160° C. for 20 minutes. The molded parts exhibited good physical properties and good low temperature dynamic mechanical properties.

EXAMPLE 18

The following ingredients were mixed as in Example 2 for preparation of an EPDM/natural rubber blend.

| | |
|---|---|
| Epcar 585[1] | 320.00 g |
| Natural rubber (SMR-5L[2]) | 60.00 g |
| Carbon black (N-347[3]) | 155.00 g |
| Stearic acid | 4.00 g |
| Zinc oxide | 20.00 g |
| Sunfluid PAO 4cSt[4] | 120.00 g |
| Synfluid PAO 6cSt[5] | 115.00 g |
| Dixon 200-42[6] | 232.00 g |
| 2-mercaptobenzothiazole | 7.75 g |
| Tetramethylthiuram disulfide | 3.10 g |
| Tellurium diethyldithiocarbamate | 3.10 g |
| Sulfur #104 (Rubbermakers)[7] | 3.10 g |
| Dipentamethylenethiuram hexasulfide | 3.10 g |
| Calcium oxide | 19.40 g |

[1]Trademark, Polysar Ltd., EPDM
[2]Akron Chem. Co., Akron, Ohio
[3]ASTM Designation
[4]Trademark, Chevron Chemical Company
[5]Trademark, Chevron Chemical Company
[6]Trademark, The Joseph Dixon Crucible Co., particulate graphite
[7]Trademark, Harwick Chemical Corp.

The resulting composition was molded into sheets by compression molding at 155° for 24 minutes. The molded specimens exhibited good low temperature flexibility.

EXAMPLE 19

The procedure of Example 18 is repeated with the exception that the natural rubber (SMR-5L) is replaced by an equivalent amount of butyl rubber (Butyl 268, trademark, Exxon Corp.) The resulting composition is moldable and exhibits good properties.

EXAMPLE 20

The procedure of Example 18 is repeated with the exception that the natural rubber (SMR-5L) is replaced by an equivalent amount of polybutadiene (Budene 1207, trademark, Goodyear Corp.) The compound is moldable and exhibits good properties.

EXAMPLE 21

The following ingredients were mixed as in Example 1 for preparation of an EPDM wiper blade material.

| | |
|---|---|
| Epcar 585[1] | 320.00 g |
| Natural rubber (SMR-5L[2]) | 60.00 g |
| Carbon black (N-347[3]) | 155.00 g |
| Stearic acid | 4.00 g |
| Zinc oxide | 20.00 g |
| Synfluid PAO 6cSt[4] | 100.00 g |
| Sunpar 130[5] | 70.00 g |
| Sunthene 255[6] | 60.00 g |
| Dixon 200-42[7] | 232.00 g |
| 2-mercaptobenzothiazole | 7.75 g |
| Tetramethylthiuram disulfide | 3.10 g |

| | |
|---|---|
| Tellurium diethyldithiocarbamate | 3.10 g |
| Sulfur #104 (Rubbermakers)[8] | 3.10 g |
| Dipentamethylenethiuram hexasulfide | 3.10 g |
| Calcium oxide | 19.40 g |

[1]Trademark, Polysar Ltd., EPDM
[2]Trademark, Akron Chem. Co., Akron, Ohio
[3]ASTM Designation
[4]Trademark, Chevron Chemical Company, polyalphaolefin oil
[5]Trademark, Sun Refining and Marketing Co., Philadelphia, PA., paraffinic oil
[6]Trademark, Sun Refining and Marketing Co., Philadelphia, PA., naphthenic oil
[7]Trademark, The Joseph Dixon Crucible Co., graphite
[8]Trademark, Harwick Chemical Corp., Akron, Ohio The above mix molded well and the molded parts exhibited good physical and dynamic properties.

While particular embodiments of the invention have been described, it will be obvious to those skilled in the art that various changes and modification may be made without departing from the invention, and it is intended to cover in the appended claims all such modifications and equivalents as fall within the true spirit and scope of this invention.

I claim:

1. An elastomer composition comprising a substantially homogeneous mixture of:
   (a) 100 parts by weight of elastomer having a fully saturated backbone;
   (b) curing agent for said elastomer in amount sufficient to crosslink said elastomer;
   (c) reinforcing particulate filler; and
   (d) at least 20 parts by weight polyalphaolefin oil having a kinematic viscosity of between about 2 and about 200 centistokes wherein at least 85% by weight of said polyalphaolefin oil boils above about 180° C.

2. The elastomer composition according to claim 1, wherein said polyalphaolefin oil is included in said composition in an amount of between about 30 and about 80 parts by weight based on 100 parts by weight of said elastomer.

3. The elastomer composition according to claim 1, wherein said polyalphaolefin oil has a kinematic viscosity between about 3 and about 10 centistokes.

4. The elastomer composition according to claim 1, wherein said polyalphaolefin oil is selected from (i) synthetic polyalphaolefin basestock, (ii) synthetic polyalphaolefin oil based engine oils, and (iii) blends thereof.

5. The elastomer composition according to claim 1, wherein said reinforcing particulate filler is selected from organic and inorganic particulate.

6. The elastomer composition according to claim 5, wherein said reinforcing particulate comprises carbon black.

7. The elastomer composition according to claim 6, wherein said composition comprises between about 15 and about 100 parts by weight carbon black.

8. The elastomer composition according to claim 1, further comprising at least 20 parts by weight particulate graphite.

9. Wiper blades made from the composition of claim 8.

10. The elastomer composition according to claim 8, wherein greater than 98% of said polyalphaolefin oil boils above about 180° C.

11. The elastomer composition according to claim 8, wherein said elastomer having a fully saturated backbone comprises ethylene-propylene-iene rubber.

12. The elastomer composition according to claim 11, wherein said curing agent for said elastomer comprises an accelerated sulfur curing system.

13. The elastomer composition according to claim 11, wherein said composition comprises between about 20 and about 100 parts by weight of said polyalphaolefin oil.

14. The elastomer composition according to claim 1, wherein said composition further comprises at least 2 parts by weight modifying oil selected from the group consisting of:
   (i) naphthenic oil having a number average molecular weight between about 300 and about 500 and a pour point between about −30° F. and about +25° F.;
   (ii) paraffinic oil having a number average molecular weight between about 400 and about 1000 and a pour point between about 0° F. and about 10° F.; and
   (iii) mixtures of (i) and (ii).

15. The elastomer composition according to claim 14, wherein said polyalphaolefin oil is selected from (i) synthetic polyalphaolefin basestock oils, (ii) synthetic polyaophaolefin oil based engine oils, and (iii) blends thereof.

16. An elastomer composition suitable for use as windshield wiper material, which composition comprises a substantially homogeneous mixture of:
   (a) 100 parts by weight ethylene-propylene-diene elastomer;
   (b) curing agent for said elastomer;
   (c) between about 15 and 100 parts by weight carbon black;
   (d) between about 20 and about 100 parts by weight particulate graphite; and
   (e) between about 20 and about 100 parts by weight polyalphaolefin oil having a kinematic viscosity of between about 2 and about 200 centistokes wherein at least 85% by weight of said polyalphaolefin oil boils above about 180° C.

17. The elastomer composition according to claim 16, wherein the composition further comprises at least 2 parts by weight modifying oil selected from the group consisting of:
   (i) naphthenic oil having a number average molecular weight between about 300 and about 500 and a pour point between about −30° F. and about +25° F.;
   (ii) paraffinic oil having a number average molecular weight between about 400 and about 1000 and a pour point between about 0° and about 10° F.; and
   (iii) mixtures of (i) and (ii).

18. Windshield wiper blades made from the composition of claim 17.

19. A method for making windshield wiper blades, which method comprises:
   (A) forming a composition comprising a substantially homogeneous mixture of:
     (a) 100 parts by weight of elastomer having a fully saturated backbone;
     (b) curing agent for said elastomer in amount sufficient to crosslink said elastomer;
     (c) between about 15 and 100 parts by weight carbon black;
     (d) between about 20 and about 100 parts by weight particulate graphite; and
     (e) between about 20 and about 100 parts by weight polyalphaolefin oil having a kinematic viscosity between about 2 and about 200 centistokes wherein at least 85% by weight of said polyalphaolefin oil boils above about 180° C.;

(B) forming said composition into said windshield wiper blades; and (C) curing said composition of said windshield wiper blades.

20. Wiper blades made according to the method of claim 19.

* * * * *